US005704553A

United States Patent [19]

Wieczorek et al.

[11] Patent Number: 5,704,553

[45] Date of Patent: Jan. 6, 1998

[54] COMPACT INJECTOR ARMATURE VALVE ASSEMBLY

[76] Inventors: David P. Wieczorek, 181 Revelle Dr., Newport News, Va. 23602; Hans J. Sailer, 119 Lakewood Dr., Williamsburg, Va. 23185

[21] Appl. No.: 550,049

[22] Filed: Oct. 30, 1995

[51] Int. Cl.[6] .............................. B05B 1/30; F16K 31/02

[52] U.S. Cl. .............................. 239/585.1; 251/129.21; 403/131

[58] Field of Search .............................. 285/382; 403/122, 403/128, 131; 239/585.1, 585.4; 251/129.21, 129.15

[56] References Cited

U.S. PATENT DOCUMENTS

| | | | |
|---|---|---|---|
| Re. 33,841 | 3/1992 | Rush et al. | 239/585.4 X |
| 4,483,485 | 11/1984 | Kamiya et al. | 239/585.4 |
| 4,790,351 | 12/1988 | Kervagoret | 251/129.21 X |
| 4,946,107 | 8/1990 | Hunt | 251/129.21 X |
| 5,222,673 | 6/1993 | Reiter | 239/585.1 |
| 5,428,883 | 7/1995 | Stieglitz | 239/585.1 |
| 5,566,920 | 10/1996 | Romann et al. | 239/129.15 X |

*Primary Examiner*—Andres Kashnikow

*Assistant Examiner*—Robin O. Evans

*Attorney, Agent, or Firm*—Russel C. Wells

[57] ABSTRACT

A compact injector armature valve assembly for a fuel injector allowing the O-ring to O-ring spacing to be reduced. The armature valve assembly is a cylindrical hollow magnetic piece, with a narrow necked down portion to act as the receiving end for a ball, which is directly attached to the necked down portion. The attachment of the necked down portion by means of crimping or chemical bonding above the mid-point of the ball allows the strengths of a pivot style guidance scheme to be used.

1 Claim, 2 Drawing Sheets

COMPACT INJECTOR ARMATURE VALVE ASSEMBLY

FIELD OF THE INVENTION

This invention relates generally to electrically operated valves, such as fuel injectors for injecting liquid fuel into an internal combustion engine, and particularly to an economical compact armature valve assembly for a solenoid operated fuel injector.

BACKGROUND OF THE INVENTION

The movement of certain electrically-operated valves, such as certain fuel injectors, comprises a needle that is reciprocated axially within the interior of the valve's body in response to electrical energization and de-energization of an electro-mechanical actuator to thereby selectively open and close a flow path through the valve. Fuel injectors typically contain a solenoid assembly that includes an electromagnetic coil which, when energized, is operative to effect axial movement of an armature. Normally the armature, which is operatively associated with a valve movable relative to a valve seat for controlling fuel injection, is slideably received and guided by its outer peripheral surface in a guide bore in the housing of the injector. Armatures can be moved in one direction by an electro-magnetic force generated by a coil of wire and moved in the opposite direction by a return spring.

Fuel injectors historically have consisted of at least a two part armature needle assembly. The armature is made of magnetic material and is in the magnetic flux path. The needle is typically hardened magnetic material and is used to seal, meter, or provide a guiding surface. Because the needle performs different functions, the traditional needle design comprises many machined precision surfaces, adding complexity and cost to the assembly.

One recent needle design, utilized in a DEKA™ injector of the type manufactured by Siemens Automotive Corporation, comprises a rod, with grooves on one end for attachment to the armature, and a precision ground sealing and guiding surface on the other end. Although this needle design has less precision machining required than prior needle designs, and hence lower cost associated therewith, it has limitations. In addition to the outer diameter of the armature being a bearing surface, both the separate guiding and the sealing surface on the needle also serve as bearings, resulting in a three point guiding scheme. As with any multiple point guidance system, non-alignment of the guides can contribute to erratic movement and non-repeatability, and can eventually cause a wear phenomena, which has negative implications in the sealing of a fuel injector. Shortening the bearing length makes alignment of the centerlines even more critical.

Because of recent trends in engine component downsizing, somewhat due to a reduction in the height inside the engine compartment, the O-ring to O-ring spacing on injectors must be reduced. Since a large portion of the injector length is due to the length of the armature and needle, a reduction in the length of these parts will reduce the overall spacing between the O-rings. In order to reduce the length, the attachment of the valve sealing member or ball to the armature must be modified.

It is seen then that it would be desirable to have a compact injector armature assembly for a solenoid operated fuel injector which overcomes the disadvantages of the prior art.

SUMMARY OF THE INVENTION

This need is met by the economical compact armature valve injector assembly according to the present invention, wherein a valve sealing member or ball is directly attached to the armature. In addition to the smaller size, the assembly is very economical to manufacture and has performance benefits for the injector. Briefly, the invention comprises the implementation of certain constructional features into the fuel injector in the armature region. Principles of the invention are of course potentially applicable to forms of fuel injectors other than the one specifically herein illustrated and described.

According to the present invention, a solenoid-operated fuel injector comprises a housing forming an enclosure which contains a solenoid coil that is selectively energized by electric current to operate the fuel injector. An inlet connector tube extends into the solenoid coil to convey liquid fuel into the enclosure. Fuel is ejected from the enclosure via an axially opposite nozzle outlet end. A valve mechanism is disposed within the enclosure between the inlet connector tube and the outlet end, and is operated by the solenoid coil acting through a spring-biased armature to open and close a flow path through the enclosure between the inlet connector tube and the outlet. The armature is a cylindrical hollow magnetic piece, with a narrow necked down portion to act as the receiving end for a valve sealing member or ball, which is directly attached to the armature. The attachment of the armature above the mid-point of the ball allows the strengths of a pivot style guidance scheme to be used, yet it maintains current component numbers and assembly strategies.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
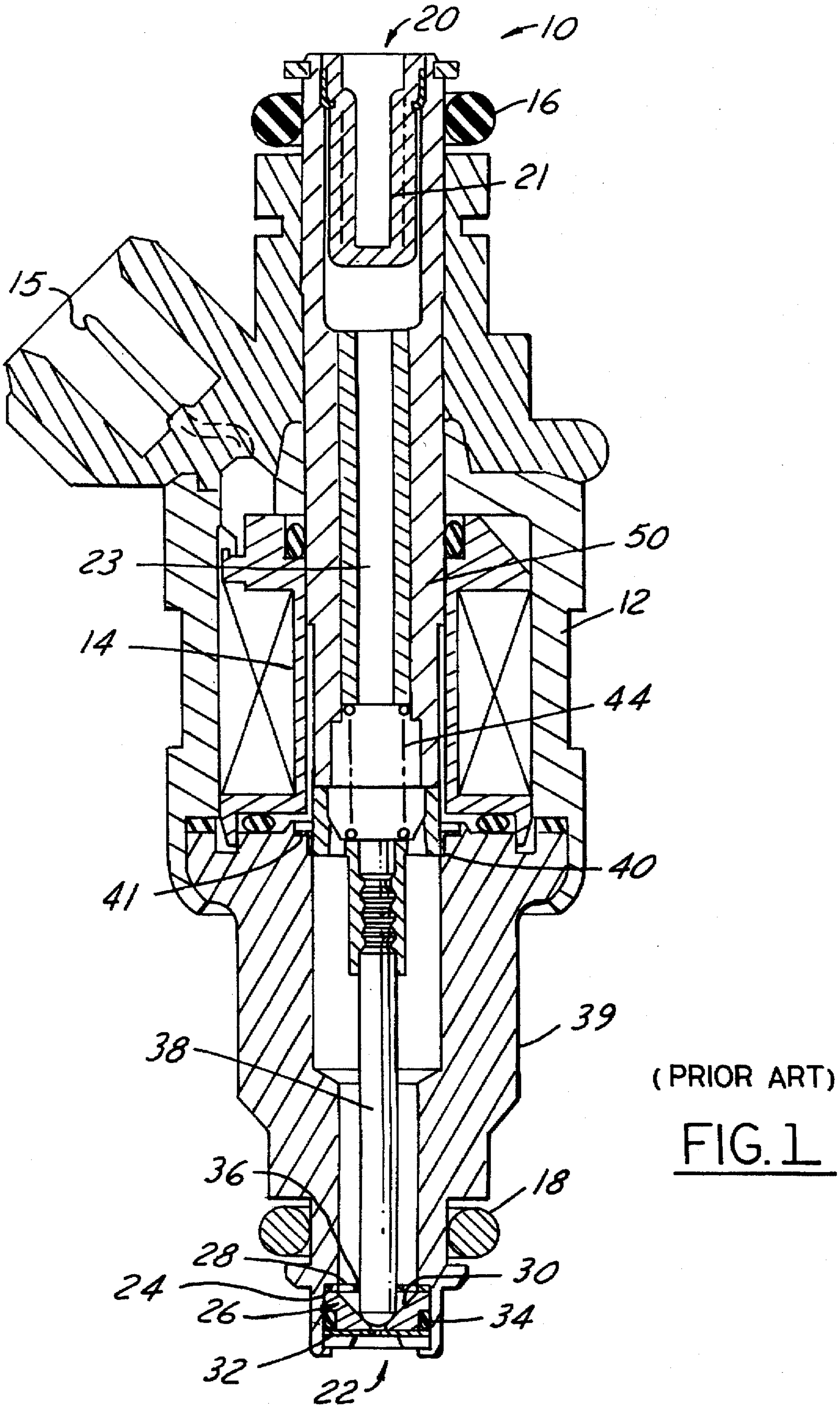
(PRIOR ART) FIG. 1
FIG. 1 is a prior art cross section view through a prior art fuel injector.

Referring to the drawings, corresponding reference numerals refer to like parts throughout the drawings. In FIG. 1 there is illustrated in cross section, a typical prior art solenoid-operated fuel injector 10 designed to inject fuel into an internal combustion engine. The injector 10 includes a tubular housing 12 made from magnetic steel, such as powdered metal or a mild steel. An electromagnetic solenoid coil assembly 14 is energized by electric current from a control source not shown by means of a pair of terminals 15 to operate the fuel injector 10. The inside of the tubular housing 12 contains a plurality of different diameters to form various shoulders for a variety of different functions. Positioned at each end of the injector 10 are sealing means or O-rings 16 and 18 to seal the injector 10 in a bore of an engine manifold where it is located and a fuel rail to which it is attached, neither of which are illustrated. The injector 10 has an inlet end 20, and a nozzle outlet end 22. Adjacent to the inlet end 20 is a filter 21 in fluid flow relationship with a fuel inlet connector tube 50 for conveying fuel in the direction toward the nozzle outlet end 22. The nozzle outlet end 22 is counterbored to form a shoulder 24 for locating a valve seat assembly 26. The valve seat assembly 26 is comprised of a valve seat 30, a lower needle guide disk 28 and an orifice disk 32.

The valve seat assembly 26 is crimped in the valve body member 39 for locating the lower needle guide disk 28 against the shoulder 24. The valve seat assembly 26 may include a sealing means such as an O-ring seal 34 to prevent leakage of fuel from around the valve seat assembly 26. Adjacent to the valve seat assembly 26 is the lower needle guide disk 28 having an axially aligned bore 36 through which reciprocates a needle valve 38.

The needle valve 38 has a spherical radius at one end for mating with the valve seat 30 in the valve seat assembly 26 to close the injector 10. At the end of the needle valve 38, opposite the spherical radius, there is an armature 40 which along with the needle valve 38 is free to move, very slightly, axially along an upper guide member 41. The armature 40 is biased by a spring 44 which is slideably received in a bore in the inlet connector tube 50 for biasing the valve closed.

The relative organization and arrangement of these various parts are typical of existing fuel injectors. The differences essentially relate to the inventive features herein. A ball bearing type lower sealing component, attached to a hollow tubular portion of an armature, has been proposed in the art. The ball serves as both the sealing and the guiding member, allowing the armature needle to pivot as it seats on the valve seat 30. Guidance by a two point bearing is less sensitive to alignment issues than the traditional three point guidance. This two point guidance allows this style of armature and needle to be shorter than a traditional armature and needle, and yet not result in durability failures.

Figure 2:
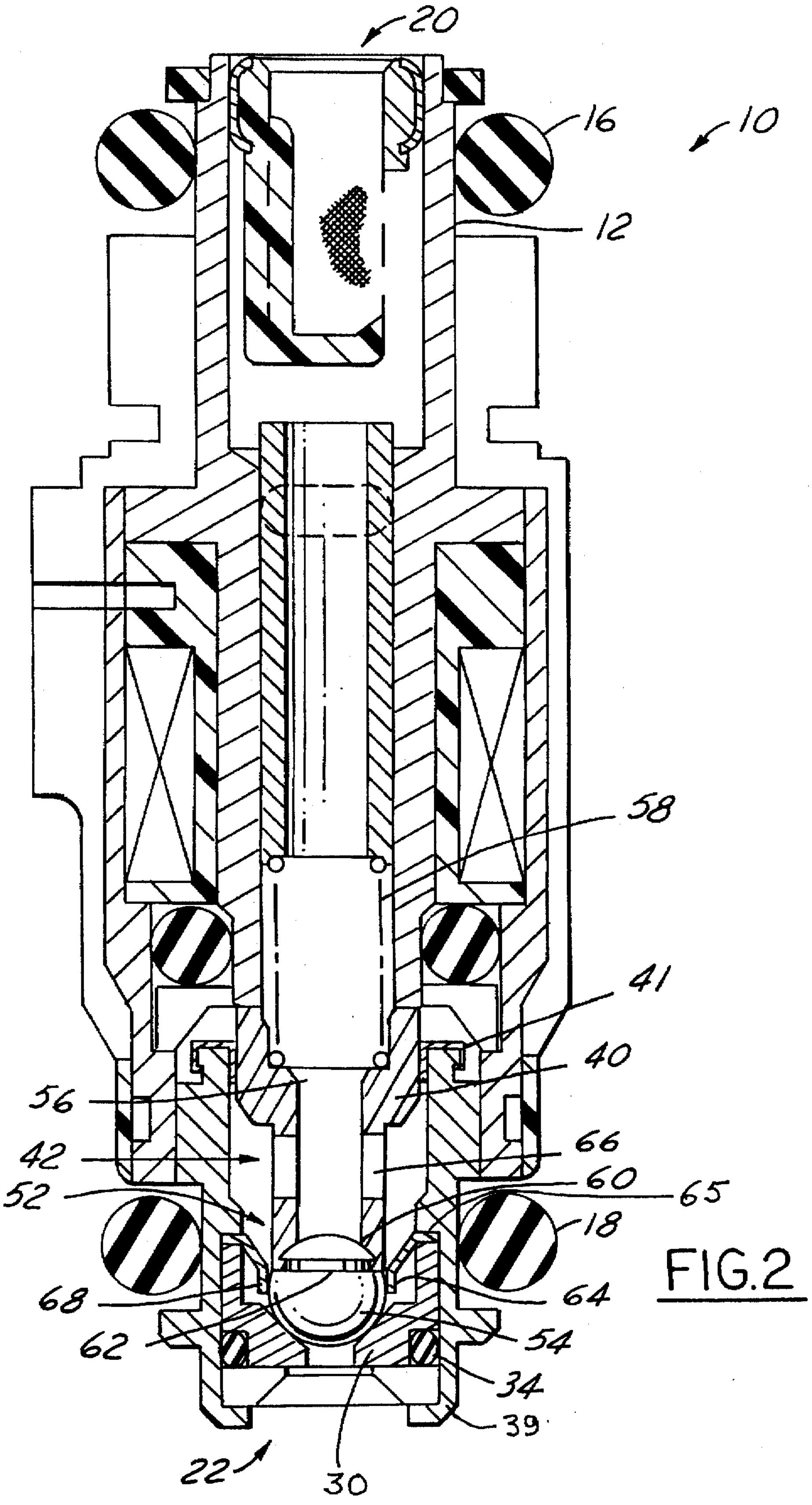
FIG. 2 is a cross section view through a fuel injector embodying the modified armature design according to the present invention.

The present invention provides for a compact injector armature valve assembly 52, illustrated in FIG. 2, for a solenoid operated fuel injector 10. The armature valve assembly 52 is comprised of only two components, the armature 40, which is a cylindrical tubular magnetic piece having a narrow necked down portion 42 and a valve sealing member or ball 54. The valve sealing member 54 is directly attached to the necked down portion 42 of the armature 40 by means such as a crimp or by chemical bonding and not requiring the conventional welding. This allows the overall length of the armature valve assembly 52 to be much shorter. The attachment of the necked down portion 42 of the armature 40 above the mid-point of the valve sealing member or ball 54 permits the strengths of a pivot style guidance scheme to be used.

Continuing with FIG. 2, the armature 40, formed from magnetic material, has at its top end 56, a counterbore or an inner diameter capable of receiving one end of return spring 58. The necked down portion 42 has a smaller inner diameter, smaller than and axially aligned with the counterbore diameter, and capable of receiving the valve sealing member 54. The valve sealing member 54 comprises a ball bearing of any suitable material including metal or ceramic. The attachment of the necked down portion 42 to the ball 54 can be accomplished by a crimping press fit, or chemical attachment. The ball 54 may include an optional circular groove 62, located between the major diameter and the top or upper end of the ball 54 to allow for or facilitate easier assembly of the ball to the necked down portion 42 of the armature 40.

The armature 40 may be formed by any suitable means such as being machined out of rod, or can be pressed powdered metal. In addition to the smaller size, the powdered metal armature housing is very economical to manufacture and has performance benefits for the injector. The improved armature valve assembly 52 is especially applicable to the shorter O-ring to O-ring injector designs because of the means for the attachment of the ball to the necked down portion 42.

In a preferred embodiment of the present invention, the upper outer diameter of the armature 40 is utilized as a guidance surface, and the diameter of the ball 54 is guided by a lower guiding member 64. The lower guiding member 64 is secured in the injector between the valve seat 30 and a shoulder 65 in the valve body 39. The lower guiding member 64 has a plurality of depending members having a plurality of flow through passages 68 therein.

The armature 40 has one or more flow through passages 66 connecting the inner diameter of the necked down portion 42 with its outer diameter, although typically not in the attachment area. The flow through passages 66 in the necked down portion 42 may be formed at any time, including during the fabricating process. The lower guiding member 64 also has flow through passages 68, to allow the fuel to flow toward the valve seat and when the injector is open, then out the nozzle end 22.

There is thus described a preferred embodiment of an economical compact injector armature valve assembly for use in fuel injectors wherein the O-ring to O-ring distance is reduced. The armature valve assembly has a molded or cast armature with a necked down portion to which is attached a valve sealing member. The valve sealing member is a ball which is secured to the necked down portion by means of crimping or chemical bonding. A circular groove in the top portion of the ball nearest the necked down portion may be used to facilitate the attachment. Guidance of the compact injector armature valve assembly is by means of the ball against a lower guiding member 64 and the armature against an upper guiding member or eyelet 41. The ball is allowed to pivot in the valve seat to secure the closing.

What is claimed is:

1. A compact injector armature valve assembly for a solenoid-operated fuel injector allowing the reduction in the O-ring to O-ring spacing on the injector, the injector having a housing containing a solenoid coil that is selectively energized by electric current to operate the fuel injector, an inlet connector tube that extends into the solenoid coil to convey liquid fuel into the housing, an axially opposite nozzle outlet end via which fuel is ejected from the housing, a valve seat mechanism that is disposed within the housing between the inlet connector tube and the outlet end that is operated by the solenoid coil acting through a spring-biased armature valve assembly to open and close a flow path through the housing between the inlet connector tube and the outlet, the armature valve assembly wherein the improvement comprises:

a tubular cylindrical armature with a top end counterbored capable of receiving one end of a return spring, said armature forming an upper guide for the armature valve assembly;

a necked down tubular portion integral with said armature for forming an inner diameter smaller than and axially aligned with said counterbore diameter, a ball valve sealing member having a circular groove between its major diameter and its top end adjacent said inner diameter of said neck down portion for crimping said ball valve to said inner diameter, said ball valve for sealing the valve seat mechanism from fluid flow therethrough.

* * * * *